July 6, 1948. J. T. GONDEK 2,444,773
ADJUSTABLE GEARING
Filed May 18, 1944 2 Sheets-Sheet 1
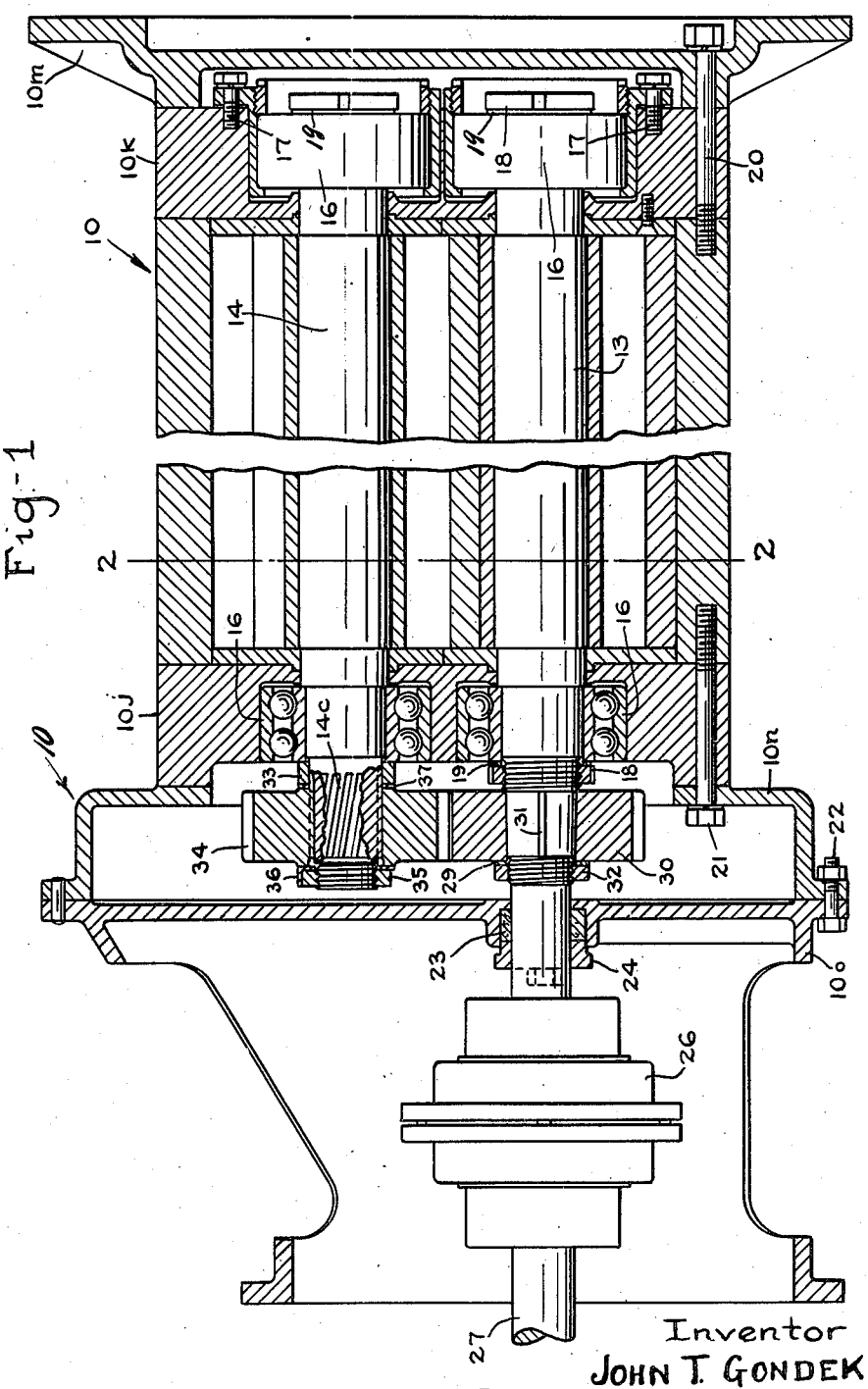
Inventor
JOHN T. GONDEK
By Chas. C. Reif
Attorney July 6, 1948.  J. T. GONDEK  2,444,773
ADJUSTABLE GEARING
Filed May 18, 1944  2 Sheets-Sheet 2
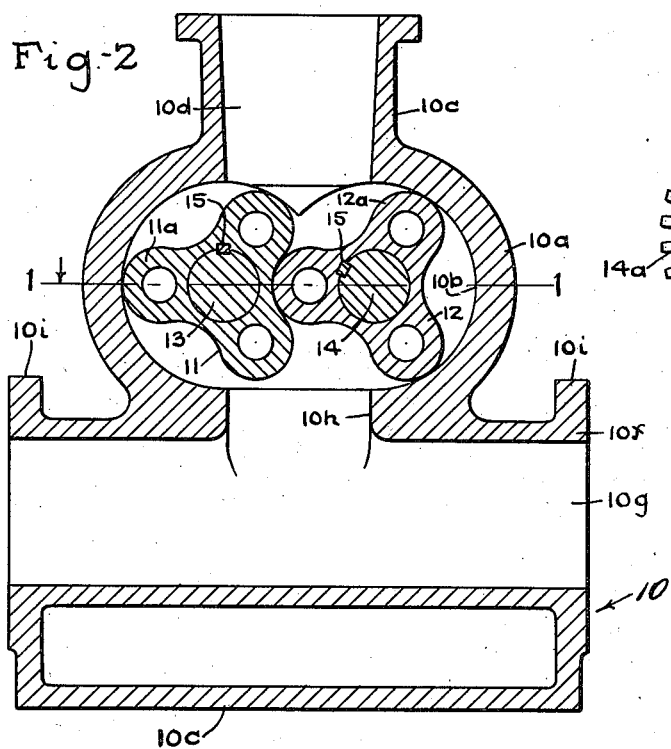
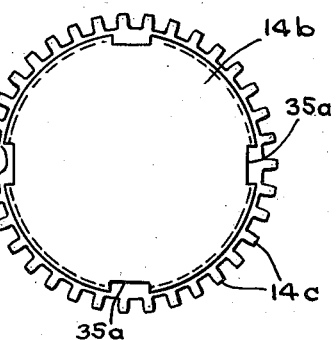
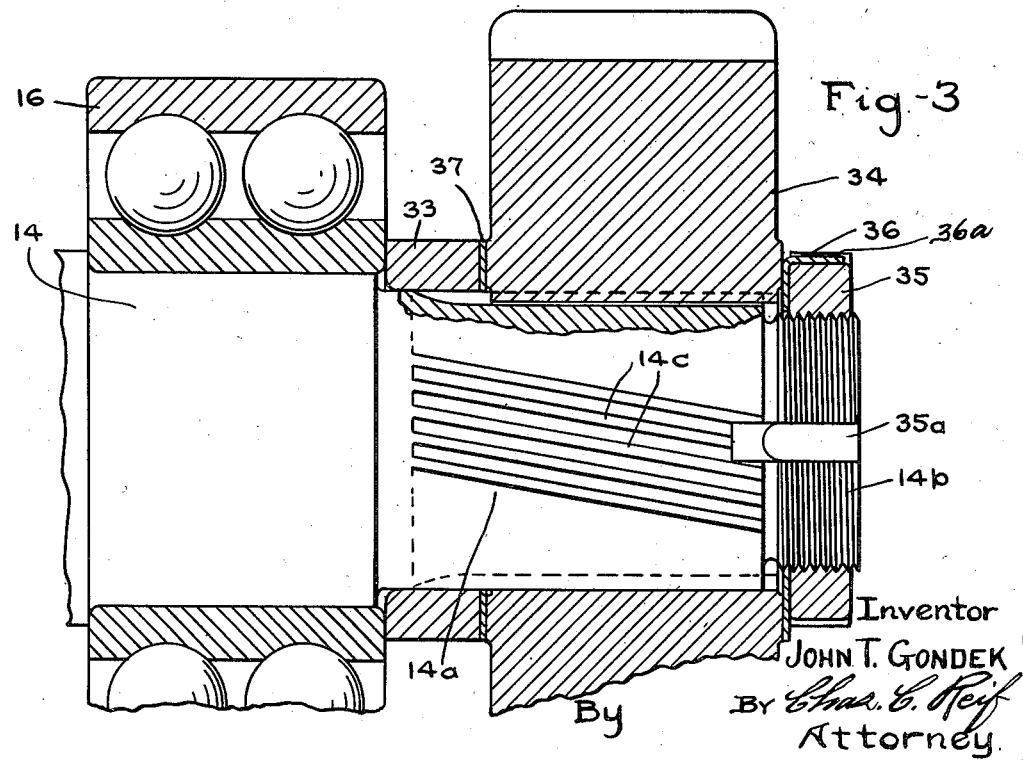
Inventor
JOHN T. GONDEK
By Chas. C. Reif
Attorney.

Patented July 6, 1948

2,444,773

UNITED STATES PATENT OFFICE 2,444,773

ADJUSTABLE GEARING

John T. Gondek, Minneapolis, Minn., assignor, by mesne assignments, to The Northern Pump Company, Minneapolis, Minn., a corporation of Minnesota Application May 18, 1944, Serial No. 536,139

3 Claims. (Cl. 74—401)

This invention relates to a pump comprising rotating cooperating rotors having interengaging or intermeshing portions as well as to a structure of adjustable gear mounting.

In a rotary pump having a pair of rotors with intermeshing lobes or vanes these rotors must be very accurately positioned so as to mesh properly. These rotors are carried on parallel shafts which have secured thereto intermeshing gears, one of which is the driving gear. The gears must thus also be fitted to mesh properly without disturbing the proper meshing of the rotors and the proper positioning of the shafts for the rotors. It has been one practice to secure the driving gear to its shaft and then to position the other gear in proper meshing relation and to permanently secure it to the driven shaft as by a feathered key. When this is done and the customer or user of the pump wishes to replace one of the gears it is impossible to make and send a gear which can be placed in position and will properly mesh with the other gear.

It is an object of this invention to provide a structure of mounting for one of said gears, preferably the driven gear, by means of which the gear can be brought to proper meshing relation.

It is further an object of the invention to provide a gear mounting to be used with a pump having intermeshing rotors by means of which the driving gears for the rotors can be easily brought to proper meshing position.

It is another object of the invention to provide a structure of gear mounting in which the portion of the shaft carrying a gear is formed with a multiplicity of circumferentially spaced splines, the gear being bored and grooved to fit over said splines, which splines are of helical form together with means for moving the gear longitudinally of said shaft to turn it somewhat circumferentially.

It is still further an object of the invention to provide a gear mounting comprising a shaft having its gear carrying portion formed as a gear, the gear carried by the shaft being bored and grooved to fit on said gear, the teeth of one of said gears being helical.

These and other objects and advantages of the invention will be fully set forth in the following description made in connection with the accompanying drawings in which like reference characters refer to similar parts throughout the several views and in which:

Fig. 1 is a horizontal section of a pump, said section being taken substantially on line 1—1 of Fig. 2;

Fig. 2 is a vertical section of said pump taken substantially on line 2—2 of Fig. 1;

Fig. 3 is a partial view in horizontal section shown on an enlarged scale; and

Fig. 4 is an end view of a shaft shown in Fig. 3.

Referring to the drawings a pump is shown comprising a frame designated generally as 10, said frame being provided with a casing portion 10a in which is formed the rotor chamber 10b. Said casing has an upwardly extending portion 10c through which extends a discharge passage 10d. Casing 10 has a base portion 10e above which is formed an inlet portion 10f having the passages 10g extending therethrough communicating with passage 10h which leads to the rotor chamber 10b. Portions 10f are constructed with flanges 10i to which can be secured the necessary connections to the pump. Said pump comprises a pair of rotors 11 and 12 shown as having a plurality of lobes or vanes 11a and 12a respectively. While the number of said lobes could be varied, in the embodiment of the invention illustrated they are shown as three in number. Rotors 11 and 12 are secured to shafts 13 and 14 respectively in any suitable manner as by the keys 15. The shafts 13 and 14 are journalled in bearings 16 at each end of the rotors 11 and 12, which bearings are carried in frame portions 10j and 10k. Said bearings 16 at one end are shown as connected to frame portion 10k by headed bolts 17. Shaft 13 is provided with threads at the outer or remote sides of bearings 16 and nuts 18 are threaded thereon, the same being shown as having locking washers 19 adjacent thereto. An end portion 10m of the frame is bolted to portion 10k by the circumferentially spaced screws or bolts 20. Portion 10n of the frame is bolted to portion 10j by the circumferentially spaced bolts or screws 21 and the portion 10o by the circumferentially spaced headed and nutted bolts 22 passing through peripheral flanges on portions 10n and 10o. Shaft 13 is the driving shaft and the same extends through the front wall of the pump formed by portion 10o and is packed by packing 23 held in a packing recess in portion 10o surrounding shaft 13, said packing being compressed by a packing gland 24. A coupling 26 connects shaft 13 to a main driving shaft 27 which will be connected to a suitable motor. Within the portion 10m shaft 13 has secured thereto a spur gear 30. Spur gear 30 is secured to a reduced portion of shaft 13 by a key 31. Shaft 13 is threaded at the outer side of gear 30 and provided with a nut 32 for holding gear 30 securely in position. A locking washer 29 is disposed between gear 30 and nut 32. Shaft 14 adjacent the front bearing 16 has a reduced portion on which is fitted a collar 33, which collar abuts bearing 16 at one side. The portion 14a of shaft 14 which carries collar 33 also carries the driven gear 34. Said portion 14a is formed as a gear having a multiplicity of teeth 14c preferably of involute form and as shown in Fig. 3, these teeth extend at an angle to the axis of shaft 14 and thus in inclined or helical form. Shaft 14 has a reduced threaded portion 14b at the outer side of gear 34 and a nut 35 is threaded on portion 14b and is provided with a locking washer 36. Washer 36 like washers 19, has projecting tongues 36a adapted to be bent substantially at a right angle and disposed in circumferentially spaced grooves 35a in shaft 35. Gear 34 is thus held against collar 33 or against one or more shims 37.

In operation when the device is assembled the rotors 11 and 12 will first be fitted to mesh properly and gear 30 will be secured to shaft 13. It is then necessary to have gear 34 properly mesh with gear 30 while maintaining the proper circumferential relation of shafts 13 and 14 and the rotors. The gear 34 can be placed on shaft portion 14a with one of the grooves in its bore fitting over a particular tooth 14c on the gear formed on portion 14a. If the gear 34 is not then in proper position it can be shifted so that said groove will be placed on the next tooth 14c. This will bring gear 34 to a different circumferential position. The actual amount of difference in the position of a tooth on gear 34 will be small. The number of teeth on gear 34 will be somewhat near the number of teeth on gear 14c. The ideal condition would be to have a difference of one tooth on gear 34 and the gear comprising teeth 14c. There would then be a very large number of different circumferential positions in which gear 34 could be placed. If gear 34 is brought almost to proper position by shifting it on the teeth 14c it can be further moved slightly by moving it to different positions longitudinally of shaft portion 14a. This can be done by rotation of nut 35. Owing to the inclined form of the teeth 14c it will be seen that any movement of gear 34 longitudinally of shaft 14 will result in some slight rotation of said gear or in bringing it to a different circumferential position. It may be necessary to place one or more shims 37 between gear 34 and collar 33 in order to properly locate said gear. It will thus be seen that gear 34 can be brought to proper position by very fine adjustments. When properly positioned it will be locked in position by nut 35. With gear 34 so held it will be very easy to replace said gear and again bring the replacing gear to the proper position.

From the above description it will be seen that I have provided a pump structure and structure of gear mounting by means of which a gear can be brought to a proper position by very fine adjustments. The invention constitutes a great improvement in the pump and as above stated, renders it possible to supply additional repair gears after the pump has left the factory. A very ingenious gear mounting has also been produced. The invention has been actually reduced to practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A structure of the class described having in combination, a pair of parallel shafts, cooperating means on said shafts determining the circumferential relative positions of said shafts, a driving gear fixed to one of said shafts, a second gear meshing with said driving gear and mounted on the other of said shafts, one of said shafts having a multiplicity of splines formed thereon, said splines extending somewhat helically of said shaft and said gear on said shaft having grooves fitting over said splines, said splines being close in number to the number of teeth on said second gear whereby a gear can replace said gear and be brought into proper meshing relation with the other gear without disturbing the circumferential relation of said shafts.

2. A structure of the class described having in combination, a pair of parallel shafts, cooperating means on said shafts determining the circumferential relative positions of said shafts, a driving gear fixed to one of said shafts, a second gear meshing with said driving gear and mounted on the other of said shafts, said latter shaft having a multiplicity of splines formed thereon, said splines extending somewhat helically of said shaft and said second gear having grooves fitting over said splines, said splines being close in number to the number of teeth on said second gear, means on said shaft for moving said second gear longitudinally thereof, and means engaging said second gear for determining its position longitudinally of said shaft.

3. A structure of the class described having in combination, a pair of parallel shafts, cooperating means on said shafts determining the circumferential relative positions of said shafts, a driving gear fixed to one of said shafts, a second gear meshing with said driving gear and mounted on the other of said shafts, one of said shafts having a multiplicity of splines formed thereon, said splines extending somewhat helically of said shaft and the gear on said shaft having grooves fitting over said splines, said splines being close in number to the number of teeth on said latter gear, means on said shaft forming an abutment adjacent said latter gear, a nut threaded on said shaft at the other side of said latter gear, and means of variable thickness disposed between said abutment and said latter gear whereby the position of said latter gear longitudinally of said shaft may be determined and fixed.

JOHN T. GONDEK.

REFERENCES CITED

The following references are of record in the file of this patent:

UNITED STATES PATENTS

| Number | Name | Date |
|---|---|---|
| 898,779 | Plank | Sept. 15, 1908 |
| 999,634 | Despaigne | Aug. 1, 1911 |
| 1,787,717 | Boulet | Jan. 6, 1931 |

FOREIGN PATENTS

| Number | Country | Date |
|---|---|---|
| 343,344 | Great Britain | Feb. 19, 1931 |
| 365,822 | Italy | Dec. 13, 1938 |
| 507,162 | Germany | Sept. 12, 1930 |

OTHER REFERENCES

Ser. No. 321,834, A. P. C. publication, May 25, 1943.